(12) United States Patent
Vyakaranam et al.

(10) Patent No.: US 8,907,014 B2
(45) Date of Patent: Dec. 9, 2014

(54) SILANE TERMINATED POLYMER FOR COATING, ADHESIVES, SEALANT AND ELASTOMER APPLICATIONS

(75) Inventors: Kamesh R. Vyakaranam, Pearland, TX (US); William A. Koonce, Pearland, TX (US); Ling Zhang, Missouri City, TX (US); Jean-Luc Roser, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/113,318

(22) PCT Filed: Jun. 14, 2012

(86) PCT No.: PCT/US2012/042385
§ 371 (c)(1),
(2), (4) Date: Oct. 22, 2013

(87) PCT Pub. No.: WO2013/003053
PCT Pub. Date: Jan. 3, 2013

(65) Prior Publication Data
US 2014/0309372 A1    Oct. 16, 2014

(51) Int. Cl.
| | | |
|---|---|---|
| *C08G 81/02* | (2006.01) | |
| *C08G 18/70* | (2006.01) | |
| *C08G 18/10* | (2006.01) | |
| *C08G 18/28* | (2006.01) | |
| *C08G 18/63* | (2006.01) | |
| *C08G 18/71* | (2006.01) | |
| *C08G 18/76* | (2006.01) | |

(52) U.S. Cl.
CPC .............. *C08G 81/025* (2013.01); *C08G 18/10* (2013.01); *C08G 18/289* (2013.01); *C08G 18/632* (2013.01); *C08G 18/718* (2013.01); *C08G 18/7621* (2013.01)
USPC .......................................... 525/102; 528/29

(58) Field of Classification Search
None
See application file for complete search history.

(56) References Cited

U.S. PATENT DOCUMENTS

| | | | |
|---|---|---|---|
| 3,931,092 A | 1/1976 | Ramlow et al. | |
| 4,521,546 A | 6/1985 | O'Connor et al. | |
| 4,522,976 A | 6/1985 | Grace et al. | |
| 6,121,354 A * | 9/2000 | Chronister | 524/262 |
| 8,394,868 B2 * | 3/2013 | Casati et al. | 521/159 |
| 8,668,804 B2 * | 3/2014 | Golombowski | 156/331.7 |
| 2007/0287761 A1 * | 12/2007 | Bender et al. | 521/129 |
| 2009/0281206 A1 | 11/2009 | Van der Wal et al. | |
| 2013/0096252 A1 * | 4/2013 | Vyakaranam et al. | 524/588 |
| 2013/0096274 A1 * | 4/2013 | Vyakaranam et al. | 528/29 |

FOREIGN PATENT DOCUMENTS

| | | |
|---|---|---|
| EP | 0732348 A1 | 9/1996 |
| EP | 2050722 A1 | 4/2009 |
| WO | 01/88036 A2 | 11/2001 |
| WO | 03/016373 A1 | 2/2003 |
| WO | 2008/005708 A1 | 1/2008 |
| WO | 2009/097234 A1 | 8/2009 |
| WO | 2011/150161 A2 | 12/2011 |

OTHER PUBLICATIONS

PCT/US2012/042385, mailed Nov. 13, 2012 International Search Report/Written Opinion of the International Searching Authority.
PCT/US2012/042385, mailed Jan. 16, 2014, International Preliminary Report on Patentability.

* cited by examiner

*Primary Examiner* — Robert S Loewe

(57) ABSTRACT

A copolymer-filled crosslinkable silane-terminated polymer having at least one crosslinkable silyl group in each molecule is provided. The copolymer-filled crosslinkable silane-terminated polymer is the reaction product of a copolymer-filled polyol and an isocyanate capped hydrosilylated polymer. The isocyanate capped hydrosilylated polymer is the reaction product of at least one isocyanate and a hydrosilylated polymer. The hydrosilylated polymer is the reaction product of a polymer having at least one unsaturated group and at least one alcoholic group in each molecule and a compound having a hydrogen-silicon bond and a crosslinkable silyl group in each molecule. The copolymer-filled crosslinkable silane-terminated polymers exhibit improved modulus and tensile strength properties while maintaining elongation properties.

20 Claims, 1 Drawing Sheet

SILANE TERMINATED POLYMER FOR COATING, ADHESIVES, SEALANT AND ELASTOMER APPLICATIONS

BACKGROUND OF THE INVENTION

1. Field of the Invention

Embodiments of the invention relate to silane-terminated polymers and methods for producing the same.

2. Description of the Related Art

Crosslinkable silane-terminated polymers (STPs) are widely used as raw material polymers in coating materials, adhesives, sealing materials, elastomers and the like (CASE applications) for architectural or industrial use. STPs typically comprise polyether polyols and vulcanizable alkoxysilane end groups. Depending on end-use applications, the mechanical property requirements of a cured STP vary significantly. One conventional method for producing an STP with improved mechanical properties, such as higher modulus and tensile strength, is to increase the functionality of the polyether polyol and/or reduce the equivalent weight of the polyol. However, modulus and tensile strength improvements achieved using conventional methods comes at the expense of elongation loss. Therefore, modulus improvement achievable using the conventional method is limited.

Therefore there is a need for crosslinkable silane-terminated polymers and methods for making such silane-terminated polymers with improved modulus and tensile strength properties while maintaining elongation properties.

SUMMARY OF THE INVENTION

Embodiments of the invention provide for crosslinkable silyl group-containing polymers that may be made using copolymer-filled polyols. In one embodiment, a copolymer-filled crosslinkable silane-terminated polymer having at least one crosslinkable silyl group in each molecule is provided. The copolymer-filled crosslinkable silane-terminated polymer is the reaction product of a copolymer-filled polyol and an isocyanate capped hydrosilylated polymer. The isocyanate capped hydrosilylated polymer is the reaction product of at least one isocyanate and a hydrosilylated polymer. The hydrosilylated polymer is the reaction product of a polymer having at least one unsaturated group and at least one alcoholic group in each molecule and a compound having a hydrogen-silicon bond and a crosslinkable silyl group in each molecule.

In yet another embodiment, a method of producing a composition comprising a copolymer-filled crosslinkable silane-terminated polymer having at least one crosslinkable silyl group in each molecule is provided. The method comprises providing a polymer having at least one unsaturated group and at least one alcoholic hydroxyl group in each molecule and having a number average molecular weight of between about 100 and about 5,000, adding to the polymer a compound having a hydrogen-silicon bond and a crosslinkable silyl group in each molecule and a hydrosilylation catalyst to thereby carry out a hydrosilylation reaction to form a composition comprising hydrosilylated polymer, capping the hydrosilylated polymer by exposing the hydrosilylated polymer to at least one isocyanate at an isocyanate index of between about 100 and about 250 to form a composition comprising isocyanate capped hydrosilylated polymers, and reacting the isocyanate capped hydrosilylated polymer with a copolymer-filled polyol to form the composition comprising a crosslinkable silane-terminated polymer.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
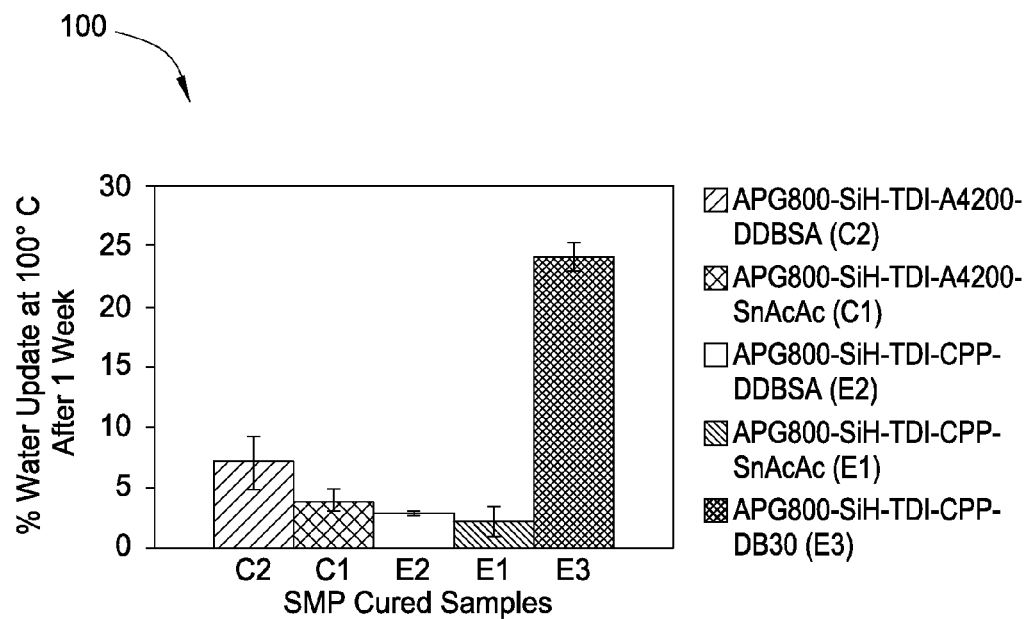
FIG. 1 is a plot comparing water uptake after a water ageing test for several copolymer-filled polyol (CPP) based silane terminated polymers formed according to embodiments described herein verses silane terminated polyethers.

Embodiments of the invention provide for silane-terminated polymers (STP) made using copolymer-filled polyols and methods for making the same.

Copolymer polyols (CPPs) are filled polyols typically comprising a polyether polyol matrix and a solid copolymer phase. The solid copolymer phase typically contains finely dispersed particles, for example, styrene-acrylonitrile, acrylonitrile, polyurea (PHD) polymer solids, and polyurethane-urea particles (PIPA). The solid copolymer phase may be chemically grafted to the polyether backbone. Copolymer polyols are typically produced by polymerizing one or more ethylenically unsaturated monomers dissolved or dispersed in a polyol (feedstock polyol) in the presence of a free radical catalyst to form a stable dispersion of polymer particles in the polyol. Other possible components of CPPs include initiators, chain transfer agents, and stabilizers.

In the embodiments described herein, STPs derived from CPPs and methods for forming the same are provided. Use of copolymer-filled polyols provides STPs with improved modulus and tensile strength without a substantial loss in elongation. Compared to the conventional method of improving modulus and tensile strength, the embodiments described herein extend the mechanical performance of a STP beyond that which is currently achievable. In addition, use of copolymer-filled polyols produces a final product which retains long term performance in contrast with the loss of properties over time experienced when conventional fillers are used.

Embodiments described herein detail a novel composition of silane end-capped polymer containing a copolymer polyol that may be adapted for any process that produces STP. One exemplary process is a three-step process involving (1) hydrosilylation of an allyl monol, (2) end-capping of the hydrosilylated intermediate with a diisocyanate and (3) coupling of the isocyanate intermediate via a copolymer-filled polyol (cPP). The compositions that are useful to make copolymer-filled STP, or cPP-STP, are cPP polyols, isocyanates, silanes, and allylic polymers.

As used herein, the term "hydrosilylation efficiency"= [100×((number of unsaturation groups on the polyol hydrosilylated)/(total number of unsaturation groups on the polyol that were initially available for hydrosilylation))], and may be measured using $^1$H-NMR or IR spectroscopy.

Hydrosilylation:

In certain embodiments described herein, the copolymer-filled STP may be obtained by the hydrosilylation of a polymer having at least one unsaturated group and at least one alcoholic hydroxyl group in each molecule. The hydrosilylated polymers may then be capped by exposing the hydrosilylated polymer to at least one isocyanate to form a composition including isocyanate capped hydrosilylated polymers. The isocyanate capped hydrosilylated polymers may then be reacted with a copolymer-filled polyol to form the copolymer-filled STP.

The polymer having at least one unsaturated group and at least one alcoholic hydroxyl group is not particularly restricted, and may include any polymer as long as they include at least one unsaturated group (such as a carbon-carbon double bond or carbon-carbon triple bond) and at least one alcoholic hydroxyl group.

The polymer having at least one unsaturated group and at least one alcoholic hydroxyl group may have a molecular weight from 40 to 20,000 g/mol, more preferably from 200 to 10,000 g/mol, and most preferably from 800 to 2,000 g/mol.

The polymer having at least one unsaturated group and at least one alcoholic hydroxyl group in each molecule may have a number average molecular weight of between about 100 and about 5,000. All individual values and sub-ranges from 100 to 5,000 are included herein and disclosed herein; for example, the number average molecular weight can be from a lower limit of 100, 200, 300, 400, 500, 600, 700, 800, 900, 1,000, 1,250, 1,500, or 1,750 to, independently, an upper limit of 1,000, 1,250, 1,500, 1,750, 2,000, 2,500, 3,000, 3,500, 4,000, 4,500, or 5,000.

In one embodiment, the polymer having at least one unsaturated group and at least one alcoholic hydroxyl group in each molecule may be a polyoxyalkylene polymer as described in co-pending PCT Patent Application No. PCT/US11/038,065, entitled "Methods for Producing Crosslinkable Silyl Group-Containing Polyoxyalkylene Polymers," which is hereby incorporated by reference in its entirety.

In one embodiment, the polymer having at least one unsaturated group and at least one alcoholic hydroxyl group in each molecule may be made by subjecting an epoxy compound to ring opening polymerization using an unsaturated group- and active hydrogen-containing compound as a polymerization initiator in presence of a catalyst. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. The active hydrogen-containing compound that may be used as a polymerization initiator is not restricted but may be any of those compounds which are applicable in association with double metal cyanide complexes, such as, for example, compounds including an alcoholic hydroxyl, phenolic hydroxyl or carboxyl group.

The polymer having at least one unsaturated group and at least one alcoholic hydroxyl group may include allyl alcohol, methallyl alcohol, trimethylolpropane monoallyl ether, trimethylolpropane diallyl ether, glycerol monoallyl ether, glycerol diallyl ether, ethylene oxide adducts or propylene oxide adducts thereof and like compounds containing at least one unsaturated group and at least one alcoholic hydroxyl group in each molecule, hydroxyl-terminated hydrocarbon compounds such as hydroxyl-terminated polybutadiene, and the like. Such active hydrogen-containing compounds serving as polymerization initiators may be used singly or a plurality thereof may be used in combination.

The monoepoxide which may be used in the ring opening polymerization may include, among others, monoepoxides having no unsaturated group such as ethylene oxide, propylene oxide, butene oxide, isobutene oxide, epichlorohydrin and styrene oxide; and unsaturated group-containing monoepoxides such as allyl glycidyl ether, methallyl glycidyl ether, glycidyl acrylate, glycidyl methacrylate, butadiene monoxide and cyclopentadiene monoxide. These may be used singly or a plurality thereof may be used in combination.

In one embodiment, the polymer having at least one unsaturated group and at least one alcoholic hydroxyl group in each molecule may be a propylene glycol monoallyl ether having a number average molecular weight between about 600 and about 1,000, and an OH number of between about 50 and about 90.

The polymer having at least one unsaturated group and at least one alcoholic hydroxyl group in each molecule may be hydrosilylated by reacting the polymer with a compound having a hydrogen-silicon bond and a crosslinkable silyl group in the presence of a hydrosilylation catalyst.

The compound having a hydrogen-silicon bond and a crosslinkable silyl group in each molecule, may be represented by the general formula (I) shown below:

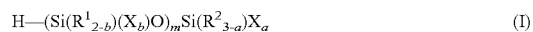

where $R^1$ and $R^2$ are the same or different and each represents an alkyl group containing 1 to 20 carbon atoms, an aryl group containing 6 to 20 carbon atoms or an aralkyl group containing 7 to 20 carbon atoms or a triorganosiloxy group represented by $R^3_3SiO—$ and, when there are a plurality of $R^1$ or $R^2$ groups, they may be the same or different; $R^3$ is a univalent hydrocarbon group containing 1 to 20 carbon atoms and the three $R^3$ groups may be the same or different with one another; X represents a hydroxyl group or a hydrolyzable group and, when there are two or more X groups, they may be the same or different with each other or one another; a represents 0, 1, 2 or 3 and b represents 0, 1 or 2; b's in the m of $—SiR^1_{2-b}(X_b)O—$ groups may be the same or different with each other or one another; and m represents an integer from 0 to 19 provided that the relation $a+\Sigma b \leq 1$ should be satisfied.

The hydrolyzable group represented by X may be any of those hydrolyzable groups known in the art, for example halogen atoms and alkoxy, acyloxy, ketoximato, amino, amido, acid amide, aminoxy, mercapto and alkenyloxy groups. Among them, alkoxy groups such as methoxy, ethoxy, propoxy and isopropoxy are preferred in view of their mild hydrolyzability and the ease of handling. One to three such hydrolyzable groups may be bonded to one silicon atom and the sum (a+Σb) is preferably 1 to 5. When there are two or more hydrolyzable groups, they may be the same or different with each other or one another. The number of silicon atoms in the crosslinkable silyl group may be about 1 to 30.

In some embodiments, the compound having a hydrogen-silicon bond and a crosslinkable silyl group in each molecule represented by the above general formula (II) may include the compounds represented by the general formula (II):

wherein $R^4$ represents an alkyl containing 1 to 20 carbon atoms, an aryl group containing 6 to 20 carbon atoms or an aralkyl group containing 7 to 20 carbon atoms or a triorganosiloxy group represented by $R^3_3SiO—$ and, when there are a plurality of $R^4$ groups, they may be the same or different; $R^3$ is a univalent hydrocarbon group containing 1 to 20 carbon atoms and the three R³ groups may be the same or different with one another; X represents a hydroxyl group or a hydrolyzable group and, when there are two or more X groups, they may be the same or different with each other or one another; and c represents 1, 2 or 3.

As specific examples of the compound having a hydrogen-silicon bond and a crosslinkable silyl group in each molecule, there may be mentioned halosilanes such as trichlorosilane, methyldichlorosilane, dimethylchlorosilane, phenyldichlorosilane, trimethylsiloxymethylchlorosilane and 1,1,3,3-tetramethyl-1-bromodisiloxane; alkoxysilanes such as trimethoxysilane, triethoxysilane, methyldiethoxysilane, methyldimethoxysilane, phenyldimethoxysilane, trimethylsiloxymethylmethoxysilane and trimethylsiloxydiethoxysilane; acyloxysilanes such as methyldiacetoxysilane, phenyldiacetoxysilane, triacetoxysilane, trimethylsiloxymethylacetoxysilane and trimethylsiloxydiacetoxysilane; ketoximatosilanes such as bis(dimethyl ketoximato)methylsilane, bis(cyclohexyl ketoximato)methylsilane, bis(diethyl ketoximato)trimethylsiloxysilane, bis (methyl ethyl ketoximato)methylsilane and tris(acetoximato) silane; alkenyloxysilanes such as methylisopropenyloxysilane; functional silanes such as isocyanatosilane; and the like. Preferred among them from the mild reactivity and ease of handling viewpoint are alkoxysilanes such as methyldimethoxysilane, trimethoxysilane, methyldiethoxysilane and triethoxysilane; and halosilanes such as trichlorosilane and methyldichlorosilane.

After the reaction with an unsaturated group in the manner of hydrosilylation, the halogen atom(s) in the halosilanes may be converted to some other hydrolyzable group(s) by reacting with an active hydrogen-containing compound such as a carboxylic acid, oxime, amide or hydroxylamine or a ketone-derived alkali metal enolate by an appropriate method known in the art.

The hydrosilylation catalyst may be any of those metal complexes the metal of which is selected from among the group VIII transition metals such as platinum, rhodium, cobalt, palladium and nickel. From the hydrosilylation reactivity viewpoint, $H_2PtCl_6 \cdot 6H_2O$, platinum-divinylsiloxane complexes, platinum-olefin complexes, Pt metal, RhCl $(PPh_3)_3$, $RhCl_3$, $Rh/Al_2O_3$, $RuCl_3$, $IrCl_3$, $FeCl_3$, $AlCl_3$, $PdCl_2 \cdot 2H_2O$, $NiCl_2$, $TiCl_4$ and the like are preferred, $H_2PtCl_6 \cdot 6H_2O$, platinum-vinylsiloxane complexes and platinum-olefin complexes are more preferred and platinum-vinylsiloxane complexes and platinum-olefin complexes are particularly preferred. The platinum-vinylsiloxane complexes collectively refer to compounds resulting from coordination of an intramolecular vinyl-containing siloxane, polysiloxane or cyclic siloxane, as a ligand, to a platinum atom. As typical examples of the ligand, there may be mentioned 1,1,3,3-tetramethyl-1,3-divinylsiloxane and the like. As specific examples of the olefin ligand in the platinum-olefin complex, there may be mentioned 1,5-hexadiene, 1,7-octadiene, 1,9-decadiene, 1,11-dodecadiene and 1,5-cyclooctadiene. Among the ligands specifically mentioned above, 1,1,3,3-tetramethyl-1,3-divinylsiloxane and 1,9-decadiene are preferred from the hydrosilylation reactivity viewpoint. The hydrosilylation catalyst to be used in the practice of the invention may be used singly or a combination of a plurality of species may be used.

The amount of the hydrosilylation catalyst to be used is not particularly restricted but generally is 0.00001 to 1 part by weight, preferably 0.00005 to 0.05 part by weight, more preferably 0.0001 to 0.01 part by weight, based on the weight of the metal in the catalyst, per 100 parts by weight of the polyoxyalkylene polymer having at least one unsaturated group and at least one alcoholic hydroxyl group in each molecule. When the amount is less than 0.00001 parts by weight, any sufficient reaction activity may not be obtained in some instances and an amount exceeding 1 part by weight may be economically disadvantageous or cause discoloration of the polymer in certain instances.

In the above reaction, the use of a solvent is essentially unnecessary. For uniformly dissolving the catalyst and/or substrate, for controlling the reaction system temperature and/or for facilitating the addition of the substrate and/or catalyst components, however, a solvent can be used. Solvents suited for these purposes include, but are not limited to, hydrocarbon compounds such as hexane, cyclohexane, ethylcyclohexane, heptane, octane, dodecane, benzene, toluene, xylene and dodecylbenzene; halogenated hydrocarbon compounds such as chloroform, methylene chloride, chlorobenzene and o-dichlorobenzene; and ethers such as ethyl ether, tetrahydrofuran and ethylene glycoldimethyl ether, among others. Those plasticizers which can be used as plasticizers for the polyoxyalkylene polymer, such as phthalate esters and polyethers, can also be used as the reaction solvents. These may be used singly or a plurality of them may be used in combination.

The hydrosilylation reaction temperature is not particularly restricted but may for example be within the range of 0° C. to 150° C., or within the range of 20° C. to 100° C. At below 0° C., the rate of reaction may be low in some instances and, at above 150° C., side reactions involving the hydroxyl group, hydrogen-silicon bond and/or crosslinkable silyl group may proceed in certain instances. In one embodiment, the hydrosilylation reaction temperature is about 60° C.

In embodiments of the invention the polymers having at least one unsaturated group and at least one alcoholic hydroxyl group in each molecule are hydrosilylated with a hydrosilylation efficiency of at least about 70%, such as between about 70% and about 100%. All individual values and subranges from about 70 to about 100 are included herein and disclosed herein; for example, the hydrosilylation efficiency can be from a lower limit of about 70, 75, 80, 90, or 92%, to, independently, an upper limit of about 80, 85, 90, 92, 94, 95, 96, 98, 99, or 100%. This includes polymers hydrosilylated with a hydrosilylation efficiency of 80 to 95% and further includes hydrosilylated polymers capped with a hydrosilylation efficiency of 85 to 95%. As used herein, the "hydrosilylation efficiency"=[100×((number of unsaturation groups on the polyol hydrosilylated)/(total number of unsaturation groups on the polyol that were initially available for hydrosilylation))], and may be measured using $^1$H-NMR.

The hydrosilylated polymers having at least one crosslinkable silyl group and at least one hydroxyl group in each molecule (hereinafter referred to as "hydrosilylated polymer") as produced by the above described process can react with water or atmospheric moisture to give crosslinked cured products and therefore is useful as a raw material or raw material intermediate for sealing, adhesive, coating and like materials or compositions for architectural or industrial use. However, the high remaining hydroxyl group percentage of this polymer having at least one crosslinkable silyl group and at least one hydroxyl may be capped with a polyisocyanate compound.

Capping:

Among the capping agents usable in the practice of the embodiments of the invention, the polyisocyanate compounds, namely compounds having two or more isocyanate groups in each molecule, include, but are not limited to, aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of the embodiments of the invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, isophorone diisocyanate (IPDI), saturated analogues of the above mentioned aromatic isocyanates, and mixtures thereof. ADI.

The functionality of the isocyanate is preferably greater than 1.0, more preferably greater than 1.5 and most preferably greater than or equal to 2.

Suitable TDI products are available from the Dow Chemical Company under the trade name VORANATE®. Suitable commercially available products of that type include VORANATE® T-80 which is also available from The Dow Chemical Company. Suitable MDI products are available from The Dow Chemical Company under the trade names PAPI®, VORANATE® and ISONATE®.

The isocyanate may have a functionality of at least greater than one, preferably greater than 1.2, and more preferably greater than 1.8.

The capping reaction may be performed at an isocyanate index of between about 100 and about 250. All individual values and sub-ranges from 100 to 250 are included herein and disclosed herein; for example, the isocyanate index can be from a lower limit of 100, 105, 110, 125, 140, 150, 160, 170, 175, 180, 190, 200, 225, to, independently, an upper limit of 150, 175, 200, 225, or 250. In some embodiments the index may be between about 160 and about 200, between about 140 and about 170, or between about 150 and about 180.

When, in the practice of the embodiments of the invention, the hydrosilylated polymer is reacted with a coupling agent such as a compound having two or more isocyanate groups in each molecule, it is not always necessary to use a catalyst. In certain embodiments, it may be preferable to perform the capping reaction without a catalyst (e.g., catalyst-free). It has been found that performing the capping reaction without a catalyst leads to a reduction of by-products (e.g., aliphanates and isocyanurates) in the capped material. For increasing the rate of reaction or improving the degree of conversion, however, a catalyst may be used. The catalyst to be used in carrying out the coupling reaction using a polyisocyanate compound includes, but is not limited to, those catalysts mentioned in Polyurethanes: Chemistry and Technology, Part I, Table 30, Chapter 4, Saunders and Frisch, Interscience Publishers, New York, 1963, for instance.

Preferred as the urethane formation reaction catalysts usable in effecting the coupling reaction using a polyisocyanate compound because of their high activity are tin catalysts such as stannous octylate, stannous stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl 3-mercaptopropionate), dibutyltinbis (isooctyl thioglycolate), dioctyltin oxide, dioctyltin dilaurate, dioctyltin diacetate and dioctyltin diversatate. Further, it is preferable to use catalysts low in activity against crosslinkable silyl groups and, thus, for example, sulfur atom-containing tin catalysts such as dibutyltin bis(isononyl 3-mercaptopropionate) and dibutyltin bis(isooctyl thioglycolate) are particularly preferred.

Coupling

The isocyanate capped polymers may be coupled with a copolymer-filled polyol to form the final copolymer-filled silane-terminated polymers (cPP-STP).

Copolymer-Filled Polyol:

Copolymer-filled polyols suitable for use with the invention described herein are well known and are widely used on a commercial scale. Copolymer-filled polyols are typically produced by polymerizing one or more ethylenically unsaturated monomers dissolved or dispersed in a polyol (feedstock polyol) in the presence of a free radical catalyst to form a stable dispersion of polymer particles in the polyol.

Exemplary feedstock polyols include polyether polyols derived from ethylene oxide, propylene oxide, butylene oxide, tetramethylene oxide, or combinations thereof, such as a polypropylene oxide polyol end-capped with ethylene oxide. Any polyol regardless of the molecular weight may be used. The molecular weight of the polyether polyol is preferably in a range of 1,000 to 10,000 g/mol, more preferably in a range of 2,000 to 8,000 g/mol and most preferably in a range of 2,000 to 6,000 g/mol. The functionality of the polyol is preferably in a range of 1.1 to 8, more preferably in a range of 1.5 to 6, and most preferably in a range of 2 to 4. The feedstock polyol may also be a blend of two or more polyols.

The dispersed phase of the copolymer polymers is created by in situ polymerization of at least one vinyl monomer. Suitable ethylenically unsaturated monomers are known to those skilled in the art and include, for example, those disclosed in U.S. Pat. No. 3,931,092 and U.S. Pat. No. 4,521,546, the disclosures of which are incorporated herein by reference. Examples of typical monomers include, vinyl chloride, methyl methacrylate, α-methylstyrene, p-methylstyrene, methacrylonitrile, vinylidene chloride, styrene, acrylonitrile, hydroxyethyl acrylate, butadiene, isoprene, chloroprene and methacrylonitrile. The preferred vinyl monomers are styrene and acrylonitrile. Mixtures of vinyl monomers may be used, for example, mixtures of styrene and acrylontrile, in weight ratios of 80:20 to 20:80, more preferably 70:30 to 30:70, and most preferably 65:35 to 35:65. Mixtures of vinyl monomers comprising 50 weight percent or more of styrene with one or more monomers other than styrene may be used. The amount of monomer (s) is generally chosen to give a solids content of 40 to 80 weight percent. The particle size distribution of the solids may be multi-modal. The particle size of the solids may be from 0.1 to 10 microns.

Polymerization of the vinyl monomers is generally done with a polymerization catalyst. Such catalysts are well known in the art, see for example, U.S. Pat. Nos. 4,521,546 and 4,522,976, the disclosures of which are incorporated herein by reference. Preferably a free radical polymerization initiator such as azobisalkylnitrile, for example azobis(isobutyronitrile) (AIBN), azobis(4-cyanovaleric acid), azobis(dimethyl-valeronitrile), preferably AIBN; peroxy compounds, for example, hydroperoxides, peroxyesters and peroxyketones, and the like. Commonly used peroxide catalysts are sold under the TRIGONOX trademark of Akzo Nobel. Other specific examples include hydrogen peroxide, di(t-butyl)-peroxide, t-butylperoxy diethylacetate, t-butyl peroctoate, t-butyl peroxyisobutryate, t-butyl peroxypivalate, t-amyl peroxypivalate, t-butyl peroxy-2-ethyl hexanoate, lauroyl peroxide; cumene hydroperoxide, and t-butyl-hydroperoxide. A combination of polymerization catalysts may also be used. The amount of catalyst will vary based on the type of catalyst and amount of ethylenically unsaturated monomers.

To produce a dispersion of polyurethane-urea particles (PIPA) or urea particles (PHD) in the polyol blend, PIPA or PHD forming monomer is dissolved in the polyol blend. If a PHD polymer polyol is desired, the PHD forming monomers may include amines, such as ammonia, anilines and substituted anilines, and fatty amines. The PHD forming monomers may also include diamines, such as ethylenediamine, 1,6-hexamethylenediamine, alkonolamines, and hydrazine.

If a PIPA polymer polyol is desired, the PIPA forming monomers may include diols, such as glycol; and alkanolamines, such as monoethanolamine, diethanolamine, triethanolamine, triisopropanolamine, 2-(2-aminoethoxyethanol), hydroxyethylpiperazine, monoisopropanolamine, diisopropanolamine and mixtures thereof. Other alkanolamines which may be considered include N-methylethanolamine, phenylethanolamine, and glycol amine. It is also possible to provide a mixture of PHD and PIPA forming monomers to form hybrid PHD-PIPA particles.

The at least one PHD and/or PIPA polymer forming monomers are added to the blend in a concentration of between about 2 wt. % and about 40 wt. % of the total polyol blend weight, preferably between about 5 wt. % and about 30 wt. %. All individual values and subranges between about 5 wt. % and about 50 wt. % are included herein and disclosed herein; for example, the solid content may be from a lower limit of 5, 8, 10, 15, 20, 25, or 30 wt. % to an upper limit of 20, 25, 30, 35, or 40 wt. % of the weight of the The composition of the PIPA and/or PHD particles may not only depend on the structure of the monomer; the composition of the polyol blend may also affect the particle compositions. Polyols such as glycerol, and amines with only alcohols, such as triethanolamine, incorporate polyurethane into the particles; aminoalcohols, such as triethanolamine, incorporate polyurethane-urea into the particles; primary or secondary amines, such as hydrazine or Ethylenediamine, incorporate polyurea into the particles. Another monomer can be water which forms additionally polybiuret's and polyallophanate's. Typically, the isocyanate reactive particles are obtained by under-indexing, i.e. by using an amount of polyisocyanate lower than the theoretical one needed to fully react the monomer. Additionally the polymer itself can contain reactive groups, such as for instance polyureas, although these are not as reactive as hydroxyls or secondary amine moieties.

Additionally, catalysts may be combined with the polyol blend. Catalytic quantities of organometallics may be used. Organometallic compounds useful as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, bismuth neodecanoate, lead 2-ethylhexoate, lead benzoate, lead oleate, dibutyltin dilaurate, tributyltin, butyltin trichloride, dimethyltin, stannic chloride, stannous octoate, stannous oleate, dibutyltin di(2-ethylhexoate), ferric chloride, antimony trichloride, antimony glycolate, tin glycolates, iron acetyl acetonate etc. The catalyst may accelerate the reaction of diisocyanate with the primary hydroxyl groups of the alkanolamines.

Under stirring, at least one isocyanate is added to the polyol blend. Stirring may be produced in stirred reactors or by using static mixers in series, as is know in the art. Isocyanates which may be used in the present invention include aliphatic, cycloaliphatic, arylaliphatic and aromatic isocyanates.

Examples of suitable aromatic isocyanates include the 4,4'-, 2,4' and 2,2'-isomers of diphenylmethane diisocyante (MDI), blends thereof and polymeric and monomeric MDI blends, toluene-2,4- and 2,6-diisocyanates (TDI), m- and p-phenylenediisocyanate, chlorophenylene-2,4-diisocyanate, diphenylene-4,4'-diisocyanate, 4,4'-diisocyanate-3,3'-dimethyldiphenyl, 3-methyldiphenyl-methane-4,4'-diisocyanate and diphenyletherdiisocyanate and 2,4,6-triisocyanatotoluene and 2,4,4'-triisocyanatodiphenylether.

Mixtures of isocyanates may be used, such as the commercially available mixtures of 2,4- and 2,6-isomers of toluene diisocyantes. A crude polyisocyanate may also be used in the practice of this invention, such as crude toluene diisocyanate obtained by the phosgenation of a mixture of toluene diamine or the crude diphenylmethane diisocyanate obtained by the phosgenation of crude methylene diphenylamine. TDI/MDI blends may also be used.

Examples of aliphatic polyisocyanates include ethylene diisocyanate, 1,6-hexamethylene diisocyanate, isophorone diisocyanate, cyclohexane 1,4-diisocyanate, 4,4'-dicyclohexylmethane diisocyanate, saturated analogues of the above mentioned aromatic isocyanates and mixtures thereof.

The at least one isocyanate is added to the polyol blend for an isocyanate index of between about 30 and about 150, such as between about 50 and about 120, between about 60 and about 110, or between 60 and 90. The isocyanate index may be kept below 100 in order to minimize isocyanate reaction with polyol. The isocyanate index is the ratio of isocyanate-groups over isocyanate-reactive hydrogen atoms present in a formulation, given as a percentage. Thus, the isocyanate index expresses the percentage of isocyanate actually used in a formulation with respect to the amount of isocyanate theoretically required for reacting with the amount of isocyanate-reactive hydrogen used in a formulation.

The at least one PHD and/or PIPA polymer forming monomers and isocyanate may be successfully reacted without the application of external heat and atmospheric pressure, although higher temperatures and pressures may also be acceptable. For example, the reaction temperature could range between about 25° C. and about 100° C., and the pressure may range from atmospheric to about 100 psig.

Exemplary copolymer-filled polyols are available from the Dow Chemical Company under the tradename SPEC-FLEX™ polyols and VORANOL™ polyols. Commercial examples of such polyols are SpecFlex® NC701, IP950S3, an experimental DMC catalyzed copolymer polyol, and VORANOL™ PP 3039.

The NCO-capped prepolymers obtained were exposed to a coupling reaction, in which the NCO-capped prepolymers were reacted with the copolymer polyol in the presence of DABCO T-12 catalyst (or dimethyl tin dineodecanoate, Metatin catalyst) at 70° C. for 2 hours to produce the silane terminated copolymer polyol.

Curing

According to the embodiments of the invention, the resulting silane-terminated polymers may be useful, among other things, to be reacted with one another to further lengthen the molecular chains for uses such as sealants, adhesives, and coatings, and combinations thereof. When silyl polymers are exposed to moisture, for example, the moisture from the atmosphere, the hydrolyzable groups which are bonded to the silicon atoms are hydrolyzed, being replaced by silicon bonded hydroxyl groups. The hydroxyl groups in turn react with each other or with other hydrolyzable groups to form siloxane (Si—O—Si) linkages. By this process the polymer molecules of the composition of the embodiments of the invention are bonded to form an infusible elastomeric material. To avoid premature curing, the compositions of the embodiments of the invention may be stored and maintained in the absence of moisture until cure is desired. Then, when cure is desired, the polymer may be exposed to atmospheric or other moisture.

Furthermore, the reaction of curing of the silyl polymer may be facilitated by use of a silanol condensation catalyst or curing accelerator. Silanol condensation catalysts or accelerators are well known in the art such as those disclosed in U.S. Pat. No. 6,355,127 and include the following: titanic acid esters, such as tetrabutyl titanate, tetrapropyl titanate, and the like; organotin compounds, such as dibutyltin dilaurate, dibutyltin maleate, dibutyltin diacetate, tin octylate, tin naphthenate, dimethyl tin dineodecanoate (Metatin catalyst), reaction products of dibutyltin oxide and phthalic acid esters, dialkyltin diacetyl acetonates, such as dibutyltin bis(acetylacetonate); dialkyltinoxides, such as dibutyltinoxide; organoaluminum compounds, such as aluminum trisacetylacetonate, aluminum trisethylacetonate, and the like; reaction products, such as bismuth salts and organic carboxylic acids, such as bismuth tris(2-ethylhexoate), bismuth tri(neodeconate), and the like; chelate compounds, such as zirconium tetracetylacetonoate, titanium tetracetylacetonate, and the like; amine compounds, such as butylamine, octylamine, dibutylamine, monethanolamine, diethanolamine, triethanolamine, diethylenetriamine, cyclohexylamine, benzylamine, and the like, or their salts with carboxylic acids, and the like. These compounds are not limited; one can use any silanol condensation catalyst which is in general use. These silanol condensation catalysts may be used individually or in combinations. Such catalysts and accelerators include tetrabutyltitanate, dibutyltin dilaurate, dibutyltin bis(acetylacetonate), and the like. The catalyst may be present in an amount of about at least about 0.1 percent by weight of the polymer, at least about 0.5 percent by weight of the polymer, at least about 1 percent by weight of the polymer, at least about 1.5 percent by weight of the polymer, or at least about 2 percent by weight of the polymer and at most about 8 percent by weight of the polymer, at most about 6 percent by weight of the polymer, at most about 5 percent by weight of the polymer, at most about 4 percent by weight of the polymer, or at most about 3.5 percent based on weight of the polymer. Such catalysts may be combined with the polymer by means within the skill in the art during the formulation of the sealant, coating, or adhesive.

The resulting cured silyl polymers are also embodiments of the invention. Similarly, the embodiments of the invention include the sealants, adhesives, and coatings and other end uses comprising these polymers or prepolymers. Preferred properties for the silyl polymers may differ somewhat for each end use as do other components that are optionally present in compositions suitable for each.

Post synthesis, cPP-STP is curable via hydrolysis reaction with moisture and is therefore environmentally friendly and is free of isocyanate monomers. The cPP-STP can be cured with the aid of a catalyst or catalysts, such as tin-based catalysts, tin-free acid catalysts or amine catalysts. The final cured material has higher tensile strength and modulus than equivalent systems that do not contain copolymers. There could also be added benefit, as in the case of the silane terminated cPP-STP, water uptake of the cured polymer is statistically lower than systems made without filled polyethers.

In certain embodiments, the process comprises (1) a hydrosilylation reaction of a vinyl-terminated monol with an alkoxysilane in the presence of a catalyst to produce an alkoxysilyl terminated monol, (2) a capping reaction of the alkoxysilyl terminated monol with an isocyanate, such as TDI (toluene diisocyanate), in a sequence of adding the alkoxysilyl monol to the isocyanate at a first temperature (e.g., 60° C.) and a certain rate with the addition of catalysts. The reaction reaches completion at a second temperature (e.g., 85° C.) producing an isocyanate capped prepolymer of 2.69 to 3.18% NCO and (3) a coupling reaction obtained by reacting the isocyanate capped prepolymer with the copolymer-filled polyol to produce the STP. In certain embodiments, the vinyl-terminated monol has a basicity from 0 to $4.7 \times 10^{-3}$ mgKOH/g, preferably from 0 to $1.9 \times 10^{-3}$ mgKOH/g, more preferably from 0 to $1.4 \times 10^{-3}$ mgKOH/g, and most preferably from 0 to $1.0 \times 10^{-3}$ mgKOH/g.

EXAMPLES

Objects and advantages of the embodiments described herein are further illustrated by the following examples. The particular materials and amounts thereof, as well as other conditions and details, recited in these examples should not be used to limit the embodiments described herein. Examples of the invention are identified by the letter "E" followed by the sample number while comparative samples, which are not examples of the invention are designated by the letter "C" followed by the sample number.

A description of the raw materials used in the examples is as follows:

ACCLAIM Polyol 4200 A difunctional polyether polyol based on propylene oxide with a molecular weight of about 4000 and a hydroxyl number of between 26.5-29.5 mg KOH/g, available from Bayer MaterialScience.

ACCLAIM Polyol 6300 A triol based on propylene oxide with a molecular weight of about 6000 and a hydroxyl number of between 26.5-29.5 mg KOH/g, available from Bayer MaterialScience.

Allyl monol A propylene glycol monoallyl ether having an allylic content of 3.5 wt % (0.998 mol of unsat/mol monol), a number average molecular weight of about 800, and an OH number of 70 or 2.1 wt % OH, commercially available from the Dow Chemical Company under the tradename UCON™ Hydrolube APPG 800.

DABCO T-12 A dibutyltin dilaurate catalyst available from Air Products.

DBTA Dibutyltin bis(acetylacetonate), Available from SIGMA-ALDRICH®.

DDBSA Dodecyl benzene sulfonic acid. Available from SIGMA-ALDRICH®.

VORANOL™ PP 3039 A grafted polyether diol containing copolymerized styrene and acrylonitrile commercially available from the Dow Chemical Company.

Karstedt's catalyst Platinum-divinyltetramethyldisiloxane and xylene as carrier solvent, the Pt loading in the catalyst is 2 wt %, available from Gelest, Inc.

Methyldimethoxysilane Available from Gelest, Inc.

SnAcAc Tin (II) Acetylacetonate, available from SIGMA-ALDRICH®.

SPECFLEX NC701 A grafted polyether triol polyol containing copolymerized styrene and acrylonitrile available from the Dow Chemical Company.

TOYOCAT-DB30 Acid blocked tertiary amine (1,8-Diazabicyclo[5.4.0]undec-7-ene) catalyst available from Tosoh Corporation.

VORANATE™ T-80 A toluene diisocyanate (80% 2,4-toluene diisocyanate and 20% 2,6-toluene diisocyanate by weight) composition, available from The Dow Chemical Company.

Zn Octoate Available from Shepherd Chemical Corporation.

Test Methods:

Tensile strength was measured according to ASTM standard test D1708. Elongation at break was measured according to ASTM standard test D1708. 100% According to ASTM standard test D1708 four dog bone samples were prepared, and analyzed for mechanical properties. The results are reported as the average of the four samples with a standard deviation. The number average molecular weight was determined by gel permeation chromatography using PEG standards, according to ASTM standard test D5296. Viscosity was measured using a rheometer AR2000 by TA Instruments. Approximately 1 mL of sample was dispensed into a 60 mm diameter 60-degree cone and plate geometry. After removal of any excess material, the viscosity test was performed by heating the sample from 20° C. to 100° C. at 3° C./min. Shear rate of the test was kept constant at 0.1 s$^{-1}$.

Hydrosilylation:

A hydrosilylation reaction was performed by charging propylene glycol monoallyl ether (343.20 g; 800 MW) into a 4-necked 250 mL pre-dried glass reactor equipped with a mechanical stirrer. Karstedt's catalyst (Approximately 0.03 g) was then added to the reactor and mixed for 2 minutes under a continuous nitrogen purge. Methyldimethoxysilane (50.02 g; 106 MW) was added last and mixed for 5 minutes before the entire reactor was heated to 60° C. for 2 hours. The hydrosilylation product (hereinafter referred to as Hydrosilylated Polyether) was analyzed using $^1$H-showing a hydrosilylation efficiency of >95%.

Prepolymer Synthesis (NCO Capping):

The Hydrosilylated Polyether (299.8 g) was then reacted with excess VORANATE™ T-80 (49.00 g) at 85° C. and at 300 rpm mixing speed for minimum of 6 hours to produce NCO-capped prepolymers.

Coupling:

The NCO-capped prepolymers obtained above were exposed to a coupling reaction, in which the NCO-capped prepolymers were reacted with the cPP polyol (VORANOL™ PP 3039 or SPECFLEX NC701) in the presence of DABCO T-12 catalyst at 70° C. for 2 hours to produce the silane terminated copolymer-filled polyol.

Curing:

The curing of the silane terminated copolymer-filled polyol was achieved by addition of tin acetyl acetanoate (SnAcAc), dodecyl benzene sulfonic acid (DDBSA), or DB-30 acrylic acid blocked amine catalyst in the presence of moisture. Films of the silane terminated polymer materials were drawn down on polypropylene sheets to 25 Mil thickness and cured at 25° C. and 50% relative humidity for minimum of one week. Physical properties of the films were measured using an INSTRON machine according to ASTM D1708.

Table I. Examples 1-3, Controls 1-2—Coupling/Curing Formulations:

TABLE I

|  | E1 | E2 | E3 | C1 | C2 |
|---|---|---|---|---|---|
| Coupling |  |  |  |  |  |
| NCO-prepolymer (g) | 34.90 | 34.90 | 34.90 | 40 | 40 |
| Acclaim 4200 Polyol (g) |  |  |  | 66.42 | 66.42 |
| VORANOL PP 3039 Copolymer-filled Polyol (g) | 64.97 | 64.97 | 64.97 |  |  |
| DABCO T-12 (µL) | 20 | 20 | 20 | 15 | 15 |
| Curing |  |  |  |  |  |
| Silane Terminated CPP Polyol Copolymer (g) | 10 | 10 | 10 | 10 | 10 |
| DBTA (g) | 0.1 |  |  | 0.1 |  |
| DDBSA (g) |  | 0.025 |  |  | 0.025 |
| DB-30 (g) |  |  | 0.1 |  |  |

Table I depicts the components involved in the coupling reaction for Example 1 through Example 3 (E1, E2, and E3) and Control 1 and Control 2. As shown in Table I, Examples 1-3 are based on the IP950-S3 copolymer-filled Polyol and Controls 1 and 2 are based on Acclaim 2200 polyether polyol.

Table II. Examples 4-5 and Control 3—Coupling/Curing Formulations:

TABLE II

|  | E4 | E5 | E6 | C3 |
|---|---|---|---|---|
| Coupling |  |  |  |  |
| NCO-prepolymer (g) | 17.3 | 17.3 | 17.3 | 17.3 |
| Acclaim 6300 polyol (g) |  |  |  | 27.2 |
| SPECFLEX NC701 Copolymer-filled polyol (g) | 34.4 | 34.4 | 34.4 |  |
| DABCO T-12 (g) | 0.01 | 0.01 | 0.01 | 0.01 |
| Curing |  |  |  |  |
| Silane Terminated CPP Polyol Copolymer (g) | 10 | 10 | 10 | 10 |
| DBTA (g) | 0.1 |  |  | 0.1 |
| DDBSA (g) |  | 0.025 |  |  |
| DB-30 (g) |  |  | 0.1 |  |

Table II depicts the components involved in the coupling reaction for Example 4 through Example 5 (E4, E5, and E6) and Control 3 (C3). As shown in Table II, Examples 4 and 5 are based on the SPECFLEX NC701 copolymer-filled polyol and Control 3 is based on Acclaim 6300 polyether polyol.

Dogbone shaped samples with a width of 0.815" and length of 0.827" of each of the elastomers were prepared. The hydrolytic stability of each sample was measured by soaking the elastomer dogbones in boiling water (100° C.) for a period of one week. The results are presented in Table III and Table IV.

Table III. Examples 1-3, Controls 1-2—Data:

TABLE III

|  | E1 | E2 | E3 | C1 | C2 |
|---|---|---|---|---|---|
| Tensile Data |  |  |  |  |  |
| Tensile Strength (psi) | 450.1 | 222.8 | 199.6 | 45 | 24.9 |
| Standard Deviation | 27.3 | 36.5 | 6.6 | 7.6 | 0.7 |
| Tensile Strength (psi) after Water Uptake | 169.4 | 118.3 | 50.6 | 17.3 | 25.1 |
| Standard Deviation after Water Uptake | 50.1 | 13.5 | 3.8 | 1.5 | 3.6 |
| Elongation Data |  |  |  |  |  |
| % Elongation at Break | 74.7 | 214.3 | 165 | 204.9 | 714.9 |
| Standard Deviation | 3.33 | 22.1 | 17.2 | 43.4 | 8.6 |
| % Elongation at Break after Water Uptake | 104.4 | 313.5 | 186.1 | 262.1 | 1002.4 |
| Standard Deviation after Water Uptake | 15.9 | 51.2 | 14.6 | 19.8 | 69 |

TABLE III-continued

|  | E1 | E2 | E3 | C1 | C2 |
|---|---|---|---|---|---|
| Modulus Data |  |  |  |  |  |
| Stress @ 100 psi | 0 | 77.7 | 105.6 | 25.4 | 6.5 |
| Standard Deviation | 0 | 3.5 | 11.7 | 1.6 | 1.4 |
| Stress @ 100 psi after Water Uptake | 152.8 | 26.7 | 22.4 | 6.8 | 2.6 |
| Standard Deviation after Water Uptake | 33.7 | 3.5 | 2.9 | 0.3 | 1.9 |

As demonstrated in Table III, Examples 1-3 which were produced using VORANOL™ PP 3039 copolymer-filled polyol exhibited superior tensile properties and modulus properties and comparable elongation properties relative to controls 1 and 2 which were produced using Acclaim 4200 polyol.

Table IV. Examples 4-5 and Control 3—Data:

TABLE IV

|  | E4 | E5 | E6 | C3 |
|---|---|---|---|---|
| Tensile Data |  |  |  |  |
| Tensile Strength (psi) 1 | 361.8 | 227.9 | 310.3 | 95.8 |
| Standard Deviation 1 | 162.5 | 40.1 | 76.5 | 7.6 |
| Tensile Strength (psi) scale up batch | 402.8 |  |  |  |
| Standard Deviation scale up batch | 30.5 |  |  |  |
| Tensile Strength (psi) Plant batch | 500 |  |  |  |
| Standard Deviation Plant batch | 101 |  |  |  |
| Tensile Strength (psi) after Water Uptake | 166.8 | 196.1 | 275.9 |  |
| Standard Deviation after Water Uptake | 25.9 | 63 | 55 | 0 |
| Elongation Data |  |  |  |  |
| % Elongation at Break | 96.6 | 111.1 | 126.1 | 141.1 |
| Standard Deviation | 30.1 | 20.3 | 24.8 | 43.4 |
| % Elongation at Break scale up batch | 164.9 |  |  |  |
| Standard Deviation scale up batch | 4.1 |  |  |  |
| % Elongation at Break Plant batch | 135 |  |  |  |
| Standard Deviation Plant batch | 19 |  |  |  |
| % Elongation at Break after Water Uptake | 114.5 | 117.4 | 156.4 | 0 |
| Standard Deviation after Water Uptake | 32.5 | 32 | 8.08 | 0 |
| Modulus Data |  |  |  |  |
| Stress @ 100 psi | 357.4 | 186.5 | 214.9 | 70.7 |
| Standard Deviation | 30 | 3.5 | 29.5 | 1.6 |
| Stress @ 100 psi scale up batch | 169.0 |  |  |  |
| Standard Deviation scale up batch | 3.99 |  |  |  |
| Stress @ 100 psi Plant batch | 311 |  |  |  |
| Standard Deviation Plant batch | 8 |  |  |  |
| Stress @ 100 psi after water uptake | 90.1 | 139.1 | 149.2 | 0 |
| Standard Deviation after Water Uptake | 34.5 | 25.6 | 31.2 | 0 |

As demonstrated in Table IV, Examples 4-5 which were produced using SPECFLEX NC701 copolymer-filled polyol exhibited superior tensile properties and modulus properties and comparable elongation properties relative to controls 1 and 2 which were produced using Acclaim 6300 polyol.

FIG. 1 is a plot 100 comparing water uptake after a water ageing test for VORANOL™ PP 3039 copolymer-filled polyols based silane terminated polymer (Examples 1 to 3) formed according to embodiments described herein verses silane terminated polyethers based on Acclaim 4200 polyether polyol (Controls 1 and 2). Example 2 (cured with acid catalyst) and example 1 (cured with tin catalyst) exhibit lower water uptake relative to controls 1 and 2.

Figure 2:
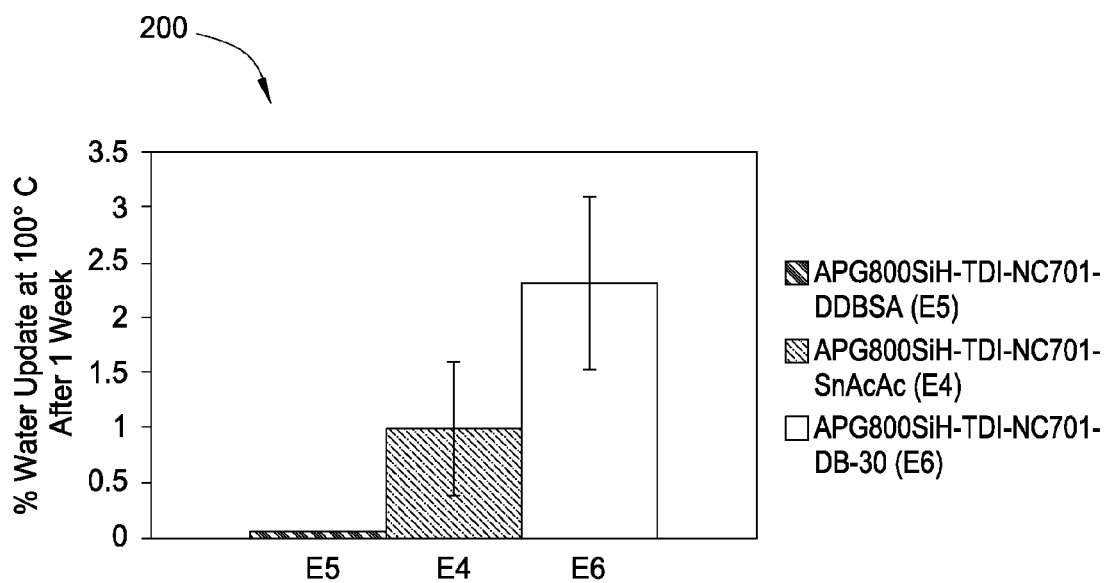
FIG. 2 is a plot comparing water uptake after a water ageing test for several copolymer-filled polyol (CPP) based silane terminated polymers cured using different catalysts according to embodiments described herein.

FIG. 2 is a plot 200 comparing water uptake after a water ageing test for SPECFLEX NC701 based silane terminated polymers (Examples 4-6) formed according to embodiments described herein. As demonstrated in FIG. 2 example 4 (cured with tin catalyst) and example 5 (cured with acid catalyst) exhibit lower water uptake results relative to example 6 (cured with an amine catalyst).

The use of a copolymer-filled polyol in silane terminated polymers allows for significant modulus improvement without substantial losses in other properties such as elongation. In addition, copolymer-filled polyols can participate in polymer matrix formation, which provides superior long-term stability compared to conventional fillers. The use of a copolymer-filled polyol in silane terminated polymers also improves processability by eliminating the need for adding additional filler to the system.

While the foregoing is directed to embodiments of the invention, other and further embodiments of the invention may be devised without departing from the basic scope thereof.

What is claimed is:

1. A composition comprising:
    a copolymer-filled crosslinkable silane-terminated polymer having at least one crosslinkable silyl group in each molecule, wherein the copolymer-filled crosslinkable silane-terminated polymer is the reaction product of:
    a copolymer-filled polyol; and
    an isocyanate capped hydrosilylated polymer comprising the reaction product of:
        at least one isocyanate; and
        a hydrosilylated polymer comprising the reaction product of:
            a polymer having at least one unsaturated group and at least one alcoholic group in each molecule; and
            a compound having a hydrogen-silicon bond and a crosslinkable silyl group in each molecule.

2. The composition of claim 1, wherein the hydrosilylated polymer is reacted with the isocyanate at an isocyanate index of between about 100 and about 250.

3. The composition of claim 1, wherein the hydrosilylated polymer is a reaction product of a hydrosilylation efficiency of at least about 70% as determined by 1H-NMR.

4. The composition claim 1, wherein the polymer having at least one unsaturated group and at least one alcoholic hydroxyl group in each molecule has a number average molecular weight of between about 100 and about 5,000.

5. The composition claim 1, wherein the polymer having at least one unsaturated group and at least one alcoholic hydroxyl group in each molecule is a propylene glycol monoallyl ether having a number average molecular weight between 600 and 1,000 and an OH number between 50 and 90.

6. The composition of claim 1, wherein the copolymer-filled polyol comprises:
    a polyether polyol matrix; and
    a solid copolymer phase.

7. The composition of claim 6, wherein the polyether polyol matrix is derived from ethylene oxide, propylene oxide, butylene oxide, tetramethylene oxide, and combinations thereof.

8. The composition of claim 6, wherein the solid copolymer phase is at least one of copolymerized styrene and acrylonitrile, styrene-acrylonitrile, acrylonitrile, polyurea (PHD) polymer solids, and polyurethane-urea particles (PIPA).

9. An article comprising the crosslinkable silane-terminated polymer of claim 1.

10. A method of producing a composition comprising a copolymer-filled crosslinkable silane-terminated polymer having at least one crosslinkable silyl group in each molecule, the method comprising:
providing a polymer having at least one unsaturated group and at least one alcoholic hydroxyl group in each molecule and having a number average molecular weight of between about 100 and about 5,000;
adding to the polymer a compound having a hydrogen-silicon bond and a crosslinkable silyl group in each molecule and a hydrosilylation catalyst to thereby carry out a hydrosilylation reaction to form a composition comprising hydrosilylated polymer;
capping the hydrosilylated polymer by exposing the hydrosilylated polymer to at least one isocyanate at an isocyanate index of between about 100 and about 250 to form a composition comprising isocyanate capped hydrosilylated polymers; and
reacting the isocyanate capped hydrosilylated polymer with a copolymer-filled polyol to form the composition comprising a crosslinkable silane-terminated polymer.

11. The method of claim 10, wherein the hydrosilylation reaction has a hydrosilylation efficiency of at least about 70% as determined by $^1$H-NMR.

12. The method of claim 10, wherein the polymer having at least one unsaturated group and at least one alcoholic hydroxyl group in each molecule has a number average molecular weight of between about 800 and about 2,000 g/mol.

13. The method of claim 10, wherein the polymer having at least one unsaturated group and at least one alcoholic hydroxyl group in each molecule comprises a propylene glycol monoallyl ether having a number average molecular weight between about 600 and about 1,000, and an OH number of between about 50 and about 90.

14. The method of claim 10, wherein the isocyanate index is between about 160 and about 200.

15. The method of claim 11, wherein the hydrosilylation efficiency is at least about 85%.

16. The method of claim 10, wherein the compound having a hydrogen-silicon bond and a crosslinkable silyl group comprises at least one of trimethoxysilane, triethoxysilane, methyldiethoxysilane, methyldimethoxysilane, phenyldimethoxysilane, trimethylsiloxymethylmethoxysilane and trimethylsiloxydiethoxysilane.

17. The method of claim 10, wherein the isocyanate comprises at least one of 4,4'-, 2,4' and 2,2'-isomers of diphenylmethane diisocyante, 2,4-toluene diisocyanate and 20% 2,6-toluene diisocyanate, or blends thereof.

18. The method of claim 10, wherein the crosslinkable silane-terminated polymer is cured with an amine containing catalyst to form a cured polymer.

19. The method of claim 10, wherein the capping the hydrosilylated polymer is a catalyst-free reaction.

20. The method of claim 10, wherein the composition comprising the crosslinkable silane-terminated polymer is cured with a tin catalyst.

* * * * *